United States Patent
Nishida et al.

(10) Patent No.: US 10,587,168 B2
(45) Date of Patent: Mar. 10, 2020

(54) ROTARY ELECTRIC MACHINE AND METHOD OF MANUFACTURING THE SAME

(71) Applicant: HONDA MOTOR CO., LTD., Tokyo (JP)

(72) Inventors: Atsushi Nishida, Saitama (JP); Manabu Yazaki, Saitama (JP); Nobuaki Hayashi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 64 days.

(21) Appl. No.: 15/787,902

(22) Filed: Oct. 19, 2017

(65) Prior Publication Data
US 2018/0115221 A1  Apr. 26, 2018

(30) Foreign Application Priority Data
Oct. 21, 2016  (JP) .................................. 2016-207231

(51) Int. Cl.
*H02K 1/32*  (2006.01)
*H02K 9/19*  (2006.01)
(Continued)

(52) U.S. Cl.
CPC .............. *H02K 9/19* (2013.01); *H02K 1/274* (2013.01); *H02K 1/278* (2013.01); *H02K 1/32* (2013.01); *H02K 15/03* (2013.01)

(58) Field of Classification Search
CPC .............. H02K 1/32; H02K 9/12; H02K 9/19
See application file for complete search history.

(56) References Cited

U.S. PATENT DOCUMENTS 2,862,122 A * 11/1958 Courtin ................. H02K 5/132
                                                                    310/54
4,980,588 A * 12/1990 Ogawa ..................... H02K 9/19
                                                                   123/41.31
(Continued)

FOREIGN PATENT DOCUMENTS

CN       101087079 A     12/2007
JP       2010-239799 A   10/2010
(Continued)

OTHER PUBLICATIONS

Feb. 6, 2018, Japanese Office Action issued for related JP Application No. 2016-207231.
(Continued)

*Primary Examiner* — Dang D Le
(74) *Attorney, Agent, or Firm* — Paratus Law Group, PLLC

(57) ABSTRACT

A rotary electric machine includes a rotor, a stator and a case. The rotor includes a rotor core, a plurality of permanent magnets disposed in the rotor core, and an end face plate disposed such that an inside surface thereof is in contact with an end face of the rotor core. The stator includes a stator core and a coil disposed in the stator core, and is disposed on an outer peripheral side of the rotor to face the rotor. The case accommodates the rotor and the stator, and includes a storage portion for storing liquid therein. A lower part of the rotor is immersed in the storage portion, and a liquid guide portion is provided on an outside surface of the end face plate to extend in a radial direction.

7 Claims, 10 Drawing Sheets

(51) Int. Cl.
*H02K 15/03* (2006.01)
*H02K 1/27* (2006.01)

(56) References Cited

U.S. PATENT DOCUMENTS

| | | | | |
|---|---|---|---|---|
| 7,642,691 | B2 * | 1/2010 | Morita | H02K 21/044 |
| | | | | 310/156.72 |
| 7,772,736 | B2 * | 8/2010 | Takahashi | H02K 21/46 |
| | | | | 310/156.57 |
| 2007/0284961 | A1 | 12/2007 | Takahashi et al. | |
| 2014/0175917 | A1 * | 6/2014 | Dedrich | H02K 9/19 |
| | | | | 310/54 |

FOREIGN PATENT DOCUMENTS

| | | | |
|---|---|---|---|
| JP | 2010-252598 | A | 11/2010 |
| JP | 2011-120417 | A | 6/2011 |
| JP | 2013-126311 | A | 6/2013 |
| JP | 5369634 | B2 | 12/2013 |
| JP | 2014-072921 | A | 4/2014 |
| JP | 5751105 | B2 | 7/2015 |

OTHER PUBLICATIONS

Mar. 28, 2019, Chinese Office Action issued for related CN Application No. 201710962862.6.

* cited by examiner

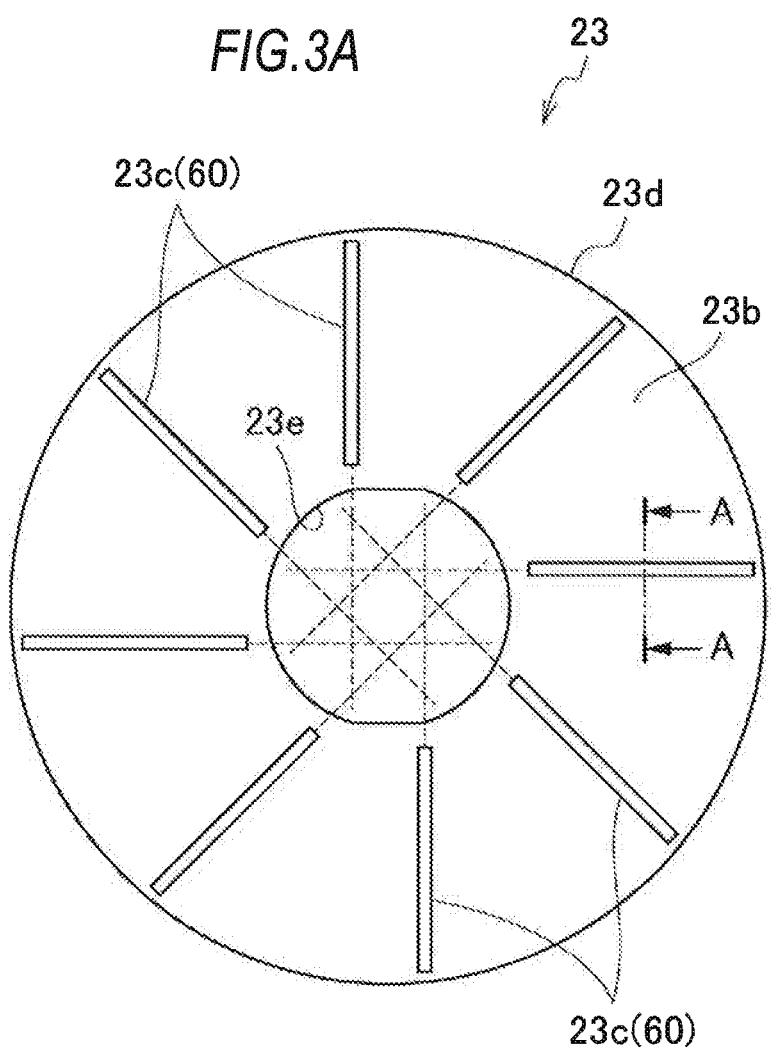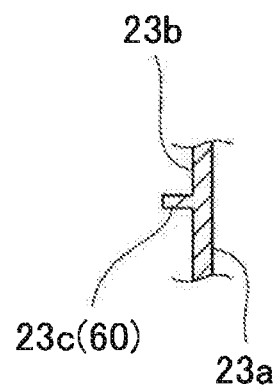
FIG.3A
FIG.3B

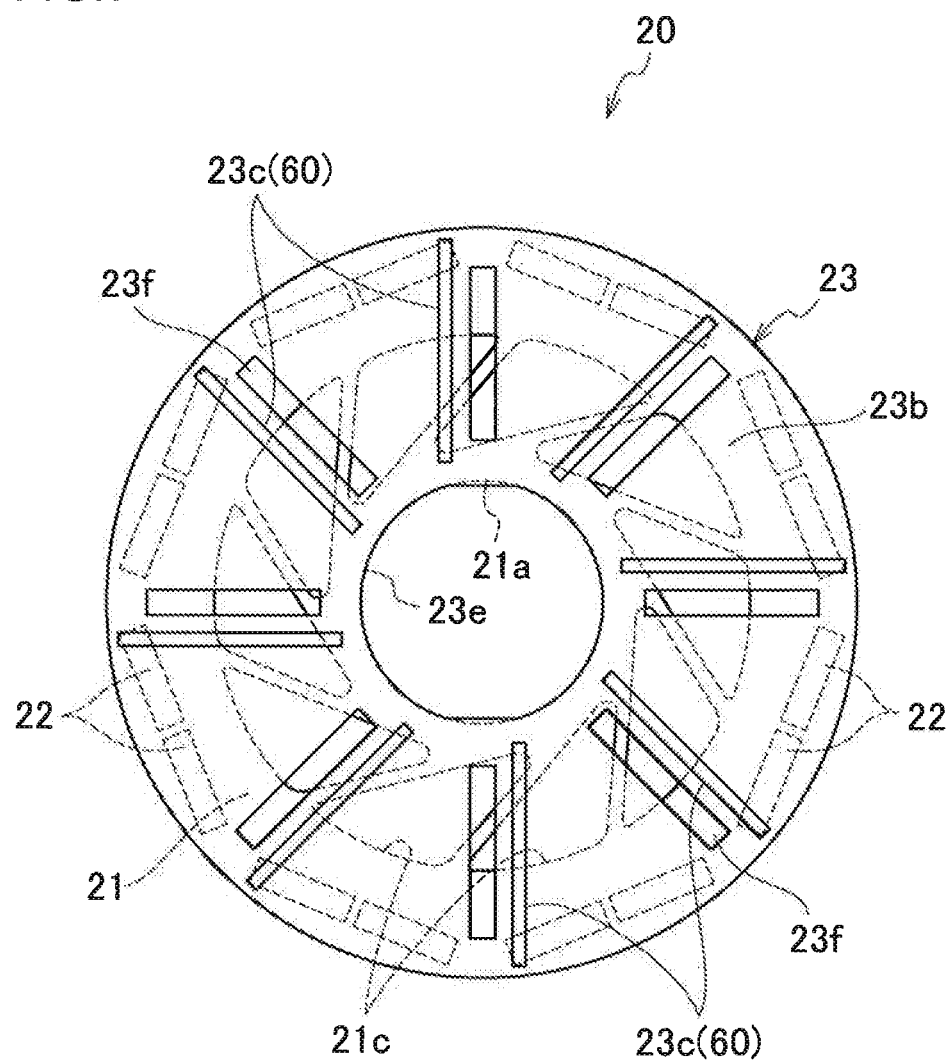

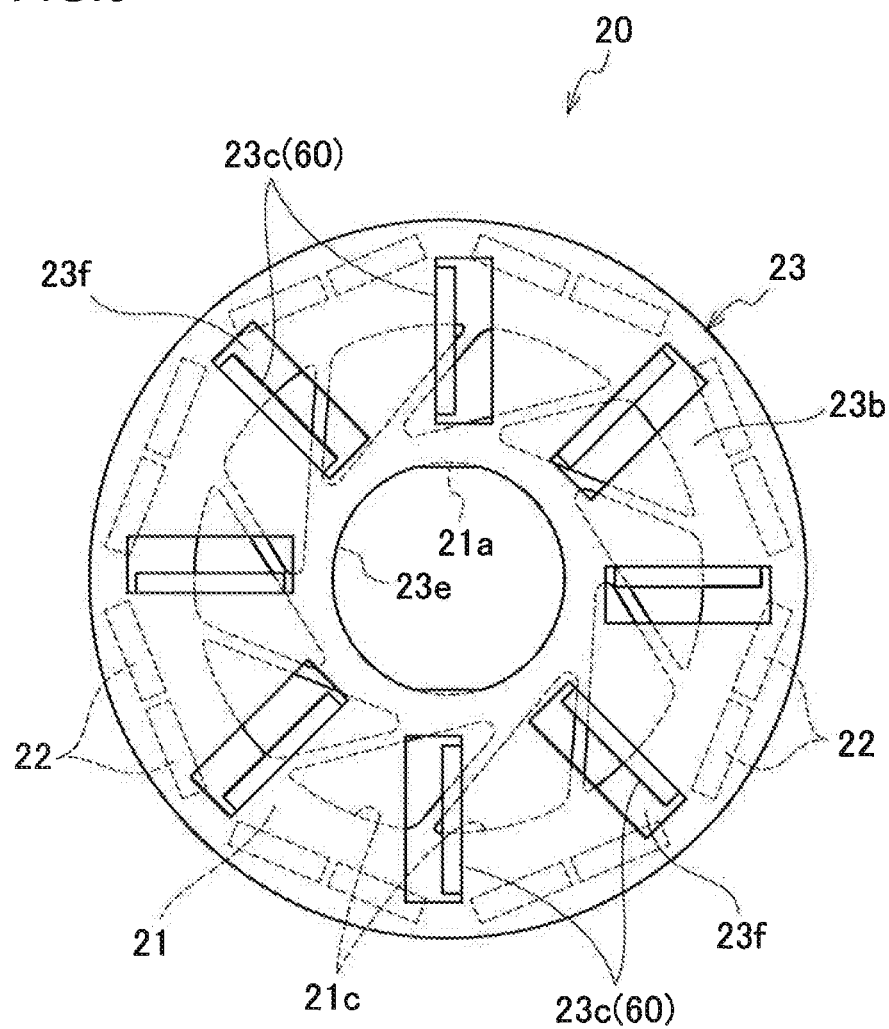

ROTARY ELECTRIC MACHINE AND METHOD OF MANUFACTURING THE SAME

CROSS-REFERENCE TO RELATED APPLICATION

This application claims priority from Japanese Patent Application No. 2016-207231 filed on Oct. 21, 2016, the entire contents of which are incorporated herein by reference.

TECHNICAL FIELD

The present invention relates to a rotary electric machine and a method of manufacturing the rotary electric machine.

BACKGROUND ART

In recent years, since there is a problem that a temperature of a permanent magnet and a temperature of a coil rise in a hybrid vehicle or an EV vehicle using a rotary electric machine as a driving source, resulting in greatly affecting performance of the rotary electric machine, a technique for efficiently cooling the permanent magnet and the coil has been proposed.

In a driving system disclosed in patent literature 1, a refrigerant scraped up by a gear, the refrigerant is supplied from the catch tank to a permanent magnet and a coil through a refrigerant passage formed inside an end face plate. Further, when the refrigerant is supplied to the refrigerant passage formed inside the end face plate, the refrigerant is supplied to a supply port of the end face plate from a cutout portion which is formed in a flange portion of a rotor shaft supporting the end face plate.

In a rotary electric machine disclosed in patent literature 2, a refrigerant discharging device is disposed outside an end face plate, a refrigerant passing through a refrigerant flow passage in a rotor shaft by a discharge pressure of an oil pump is supplied to the refrigerant discharging device through a refrigerant discharging hole of the end face plate, and the refrigerant is supplied to a coil from the refrigerant discharging device.

RELATED ART LITERATURE

Patent Literature

Patent Literature 1: JP-B-5369634
Patent Literature 2: JP-B-5751105

SUMMARY OF THE INVENTION

Problem that the Invention is to Solve

In the configuration disclosed in patent literature 1, however, the catch tank is required to scrape up the refrigerant by the gear, the housing shape becomes complicated, and the shape of the rotor shaft becomes complicated.

In the configuration disclosed in patent literature 2, the permanent magnet cannot be sufficiently cooled, the shape of the rotor shaft becomes complicated due to the shaft-center oil supply, and the oil pump and the refrigerant discharging device are separately required.

The invention is to provide a rotary electric machine and a method of manufacturing the rotary electric machine which can efficiently cool a permanent magnet and a coil with a simple configuration.

Means for Solving the Problem

In order to achieve the above object, according to an invention of aspect 1, there is a rotary electric machine (for example, a rotary electric machine 10 in an embodiment) including:

a rotor (for example, a rotor 20 in an embodiment) which includes a rotor core (for example, a rotor core 21 in an embodiment), a plurality of permanent magnets (for example, permanent magnets 22 in an embodiment) disposed in the rotor core, and at least one end face plate (for example, an end face plate 23 in an embodiment) disposed such that an inside surface (for example, an inside surface 23a in an embodiment) thereof is in contact with an face of the rotor core;

a stator (for example, a stator 30 in an embodiment) which includes a stator core (for example, a stator core 31 in an embodiment) and a coil (for example, a coil 32 in an embodiment) disposed in the stator core, and is disposed on an outer peripheral side of the rotor to face the rotor; and a case (for example, a case 50 in an embodiment) which accommodates the rotor and the stator, and includes a storage portion (for example, a storage portion 51 in an embodiment) for storing liquid therein, wherein a part of the rotor is immersed in the storage portion, and a liquid guide portion (for example, a liquid guide portion 60 in an embodiment) is provided on an outside surface (for example, an outside surface 23b in an embodiment) of the end face plate to extend in a radial direction.

According to an invention of aspect 2, in the invention of aspect 1, the liquid guide portion is a protruding portion (for example, a protruding portion 23c in an embodiment) which protrudes in an axial direction from the outside surface.

According to an invention of aspect 3, in the invention of aspect 1, the coil includes a coil end portion (for example, a coil end portion 32a in an embodiment) which protrudes from one axial end face of the stator core, and the liquid guide portion and the coil end portion overlap with each other in an axial direction.

According to an invention of aspect 4, in the invention of aspect 1, a plurality of the liquid guide portions are provided at equal intervals in a circumferential direction.

According to an invention of aspect 5, in the invention of aspect 1, the end face plate includes a shaft hole (for example, a shaft insertion hole 23e in an embodiment) through which a rotor shaft (for example, a rotor shaft 40 in an embodiment) rotating integrally with the rotor core penetrates, and a through-hole (for example, a through-hole 23f in an embodiment) which is provided outside of the shaft hole.

According to an invention of aspect 6, in the invention of aspect 5, the through-hole is disposed to extend in the radial direction between the permanent magnets adjacent to each other in a circumferential direction, and an outer-diameter-side end portion of the through-hole is positioned radially outside of the permanent magnet.

According to an invention of aspect 7, in the invention of aspect 5, the rotor core includes a permanent magnet accommodating portion (for example, an accommodating hole 21b in an embodiment magnet) which accommodates the permanent magnet, and a lightening portion (for example, a lightening hole 21c in an embodiment) which is provided radially inside of the permanent magnet accommodating portion, and the through-hole communicates with the lightening portion.

According to an invention of aspect 8, in the invention of aspect 5, the through-hole is disposed to be adjacent to the liquid guide portion along the liquid guide portion, According to an invention of aspect 9, there is a method of manufacturing the rotary electric machine of the invention of aspect 8, the method includes the steps of:

punching and forming the through-hole in the end face plate, and bending and forming a protruding portion on the outside surface.

Advantage of the Invention

According to the invention of aspect 1, since a part of the rotor is immersed in the storage portion, the permanent magnet disposed in the rotor core is cooled by the liquid stored in the storage portion. In addition, the liquid stored in the storage portion is guided to the liquid guide portion of the end face plate and is scattered by the centrifugal force with the rotation of the rotor, whereby the coil positioned on the outer peripheral side of the rotor is cooled. Thus, both the permanent magnet and the coil can be cooled without using a driving force of an oil pump or the like.

Furthermore, when the rotor rotates at the low speed, the liquid level of the storage portion is high, and thus the permanent magnet can be actively cooled. When the rotor rotates at the high speed, the liquid level of the storage portion lowers and the liquid to be scattered increases, and thus the coil can be actively cooled.

According to the invention of aspect 2, since the liquid guide portion is the protruding portion protruding from the outside surface in the axial direction, the liquid can be smoothly guided along the protruding portion.

According to the invention of aspect 3, since the liquid guide portion and the coil end portion overlap with each other in the axial direction, the liquid scattered from the end face plate can he supplied to the coil end portion.

According to the invention of aspect 4, since the plurality of liquid guide portions are provided at equal intervals in the circumferential direction, the liquid can be continuously supplied to the coil during the rotation of the rotor.

According to the invention of aspect 5, since the end face plate includes the through-hole which is provided outside of the shaft hole, the permanent magnet can be cooled through the rotor core by the liquid passing through the through-hole.

According to the invention of aspect 6, since the outer-diameter-side end portion of the through-hole is positioned radially outside of the permanent magnet, the vicinity of the permanent magnet as a heating element can be cooled, and the cooling efficiency of the permanent magnet is enhanced. In addition, since the through-hole is disposed so as to extend in the radial direction between the permanent magnets adjacent to each other in the circumferential direction, there is no hindrance to the original function of the end face plate which prevents the permanent magnet from coming out.

According to the invention of aspect 7, since the through-hole of the end face plate communicates with the lightening portion of the rotor core, the liquid supplied from the through-hole is supplied to the rotor core, so that the permanent magnet can be cooled through the rotor core.

According to the invention of aspect 8, since the through-hole is disposed so as to be adjacent to the liquid guide portion along the liquid guide portion, the through-hole and the liquid guide portion can be simultaneously worked from one thin plate in such a manner that the one thin plate is raised outward while being punched out by press working.

According to the invention of aspect 9, since the through-hole is punched and formed in the end face plate and the protruding portion is bent and formed on the outside surface, the through-hole and the liquid guide portion can be simultaneously worked.

BRIEF DESCRIPTION OF DRAWINGS

FIG. 3A is a side view of an end face plate, and FIG. 3B is a cross-sectional view taken along line A-A in FIG. 3A.

FIG. 7 is a side view of a rotor according to the first modified example.

FIG. 9 is a side view of a rotor according to the second modified example.

MODE FOR CARRYING OUT THE INVENTION

Figure 1:
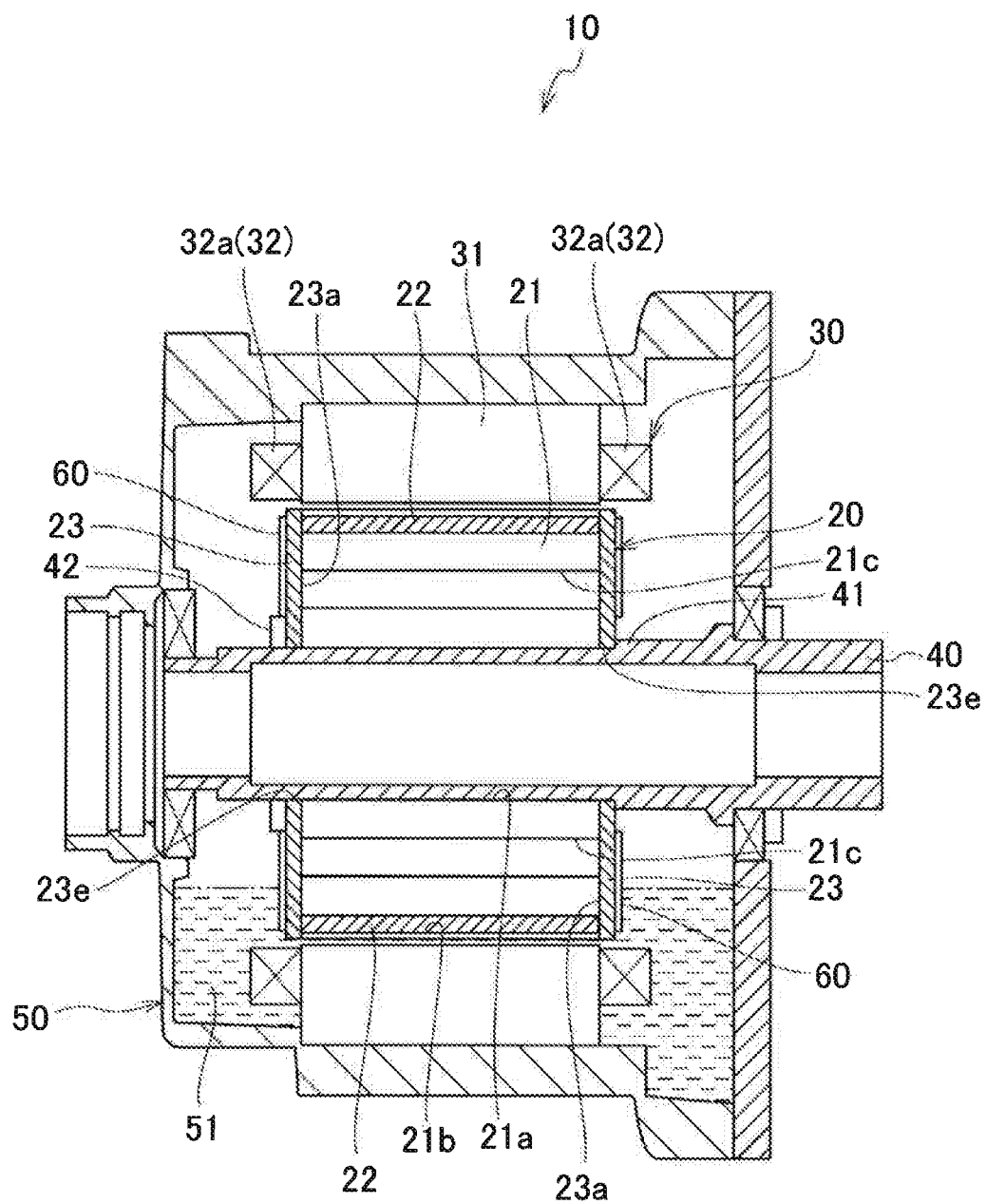
FIG. 1 is a cross-sectional view of a rotary electric machine according to an embodiment of the invention.

A rotary electric machine according to an embodiment of the invention will be described with reference to FIGS. 1 to 4 and FIGS. 5A and 5B. The drawings are seen in a direction in which reference numerals given herein look normally.

[Rotary Electric Machine]

As illustrated in FIG. 1, a rotary electric machine 10 according the embodiment is a so-called inner-rotor type rotary electric machine including a rotor 20, stators 30 disposed on an outer periphery side of the rotor 20 to face each other with a slight gap therebetween, a rotor shaft 40 attached to an inner periphery of the rotor 20 so as to rotate integrally with the rotor 20, and a case 50 that accommodates the rotor 20 and the stator 30 and rotatably supports the rotor shaft 40.

[Case]

The case 50 has substantially a cylindrical shape, and the stator 30 is fixed to the inner periphery of the case. The case 50 is provided with a storage portion 51, which stores liquid (for example, lubricating oil), at a lower part thereof.

[Stator]

The stator 30 includes a state core 31 and a coil 32 wound around the stator core 31. The stator core 31 is formed by laminating a plurality of press-punched steel sheets in an axial direction. A plurality of teeth are formed on the inner periphery of the stator core 31, and a plurality of slots partitioned and formed between the adjacent teeth penetrate through the stator core 31 in the axial direction and are disposed at equal intervals in a circumferential direction.

The coil 32 is wound around each of the teeth, and coil end portions 32a protrude from both axial end faces of the stator core 31. Since the coil 32 generates heat when the rotary electric machine 10 is driven to rotate, it is necessary to cool the coil 32 in order to avoid performance degradation and deterioration in components due to heat generation.

[Rotor]

Figure 2:
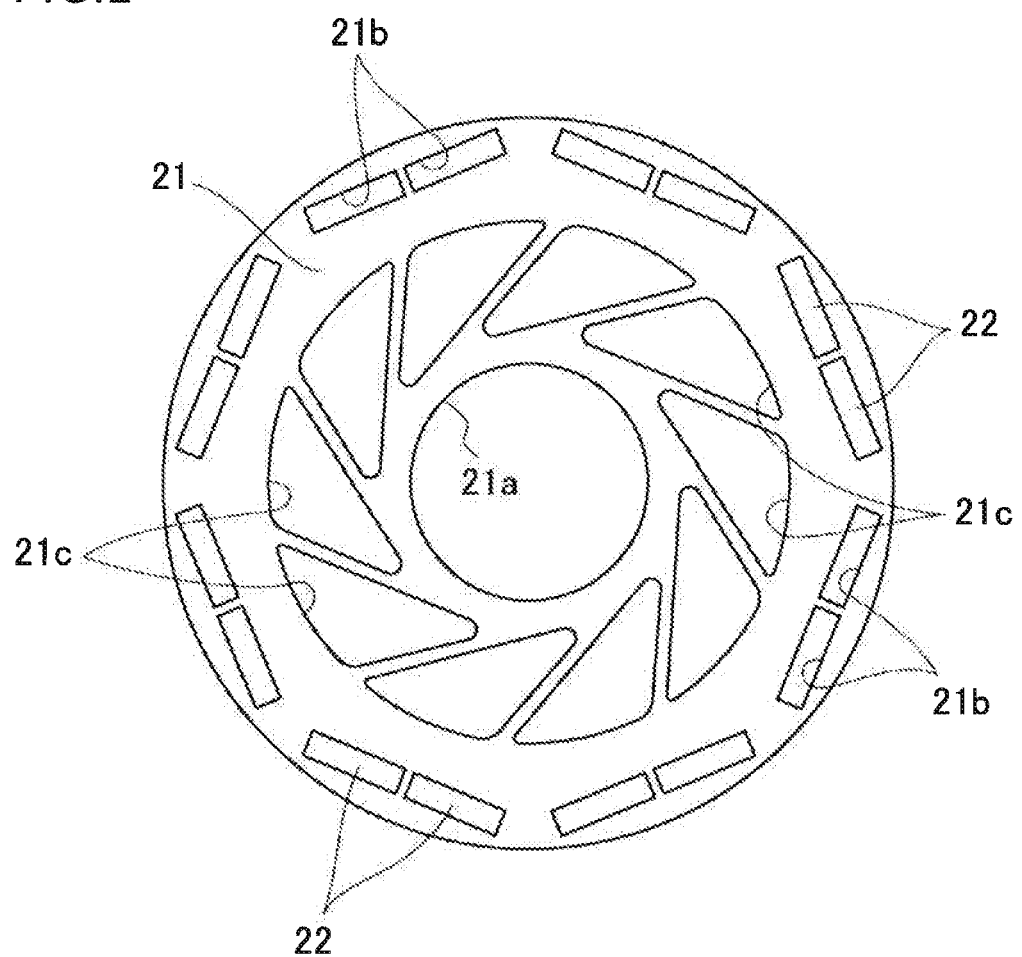
FIG. 2 is a side view of a rotor core.

The rotor 20 includes a rotor core 21, a plurality of permanent magnets 22 disposed in the rotor core 21, and a pair of end face plates 23 fixed to both end faces of the rotor core 21. The rotor core 21 is made up of a plurality of steel sheets laminated in the axial direction. A shaft insertion hole 21a is formed at the center of the rotor core 21 to penetrate through the rotor core 21 in the axial direction, and a plurality of magnet accommodating holes 21b are formed at the outer periphery of the rotor core 21 to penetrate through the rotor core 21 in the axial direction. Referring to FIG. 2, eight pairs of magnet accommodating holes 21b are formed, in total, at equal intervals in the circumferential direction, wherein two magnet accommodating holes 21b is defined as one pair. In addition, a plurality of lightening holes 21c are formed at equal intervals in the circumferential direction of the rotor core 21 between the shaft insertion hole 21a and the magnet accommodating hole 21b in a radial direction to penetrate through the rotor core 21 in the axial direction.

The permanent magnet 22 is configured using a rare earth magnet, and is attached to the magnet accommodating hole 21b of the rotor core 21. Since the permanent magnet 22 generates heat when the rotary electric machine 10 is driven to rotate, it is necessary to cool the permanent magnet 22 in order to avoid performance degradation and deterioration in components due to heat generation.

The lower part of the rotor 20 is rotatably supported by the rotor shaft 40 in a state of being immersed in the storage portion 51 provided in the case 50. Therefore, any one of the plurality of permanent magnets 22 attached to the magnet accommodating hole 21b of the rotor core 21 is immersed in the storage portion 51 even when the rotary electric machine 10 is driven to rotate.

[End Face Plate]

The end face plates 23 fixed to both end faces of the rotor core 21 has an annular shape having the same shape as the steel sheet constituting the rotor core 21, and an inside surface 23a thereof contacts with the end face of the rotor core 21 to prevent the permanent magnet 22 fixed to the magnet accommodating hole 21b from coming off.

A shaft insertion hole 23e is formed at the center of the end face plate 23 to penetrate through the end face plate 23 in the axial direction.

Figure 4:
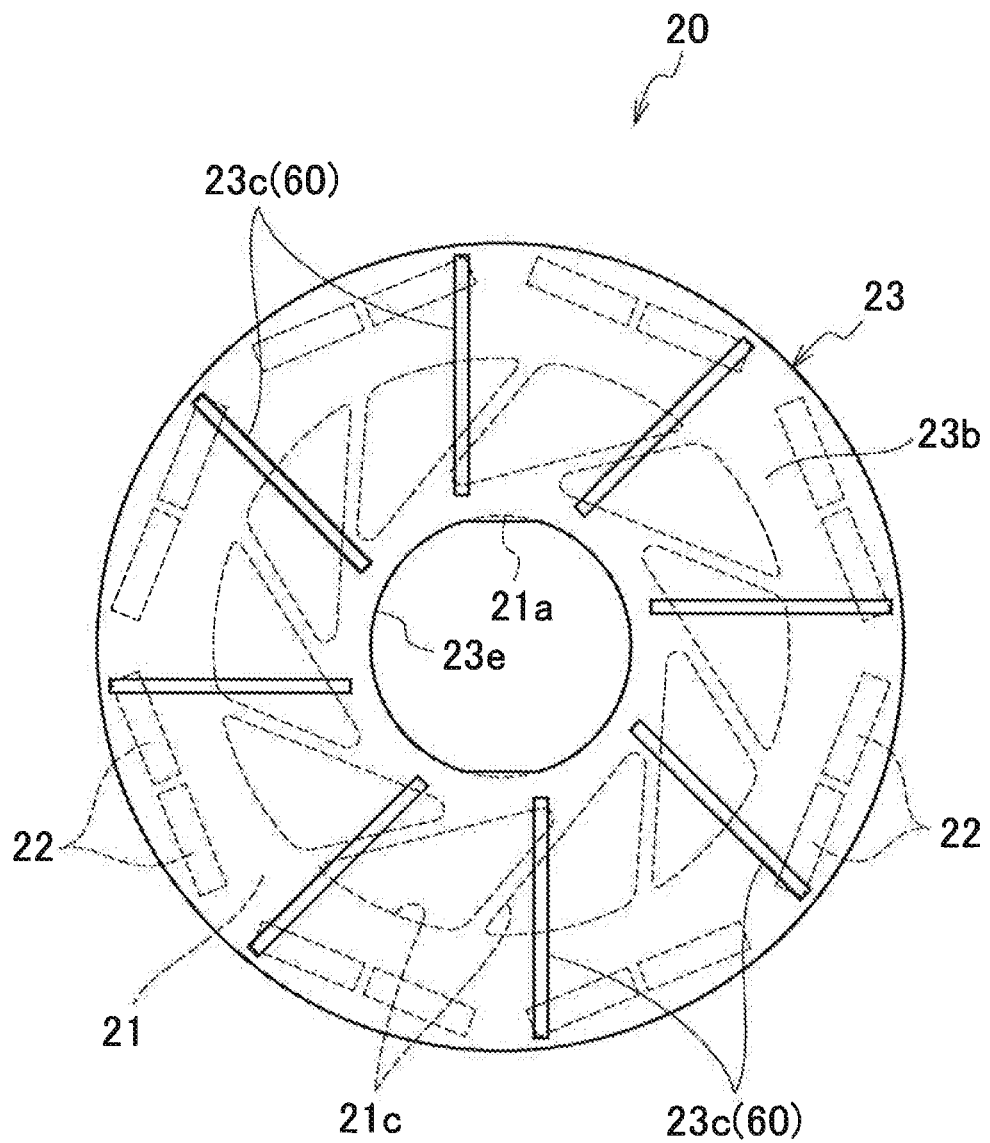
FIG. 4 is a side view of a rotor.

As illustrated in FIGS. 3A, 3B, and 4, a plurality of liquid guide portion 60 are provided on an outside surface 23b of the end face plate 23 at equal intervals in the circumferential direction so as to extend in the radial direction. The liquid guide portion 60 is a protruding portion 23c that has a rectangular cross section and protrudes from the outside surface 23b of the end face plate 23 in the axial direction, and is disposed to overlap with the coil end portion 32a in the axial direction. That is, the left liquid guide portion 60 of the end face plate 23 in FIG. 1 overlaps in the axial direction with the coil end portion 32a protruding from the left end face of the rotor core 21, and the right liquid guide portion 60 of the end face plate 23 overlaps in the axial direction with the coil end portion 32a protruding from the right end face of the rotor core 21.

In this embodiment, eight liquid guide portions 60 are formed so as to linearly extend in the radial direction from the vicinity of the shaft insertion hole 23e to the vicinity of an outer peripheral surface 23d, and imaginary lines extending along the liquid guide portions 60 to the inner periphery side are disposed so as to form a regular octagon. An inner-diameter-side end portion of the liquid guide portion 60 does not interfere with a stepped portion 41 or a retaining ring 42 of the rotor shaft 40 which fix the end face plate 23.

[Operation]

Figure 5A:
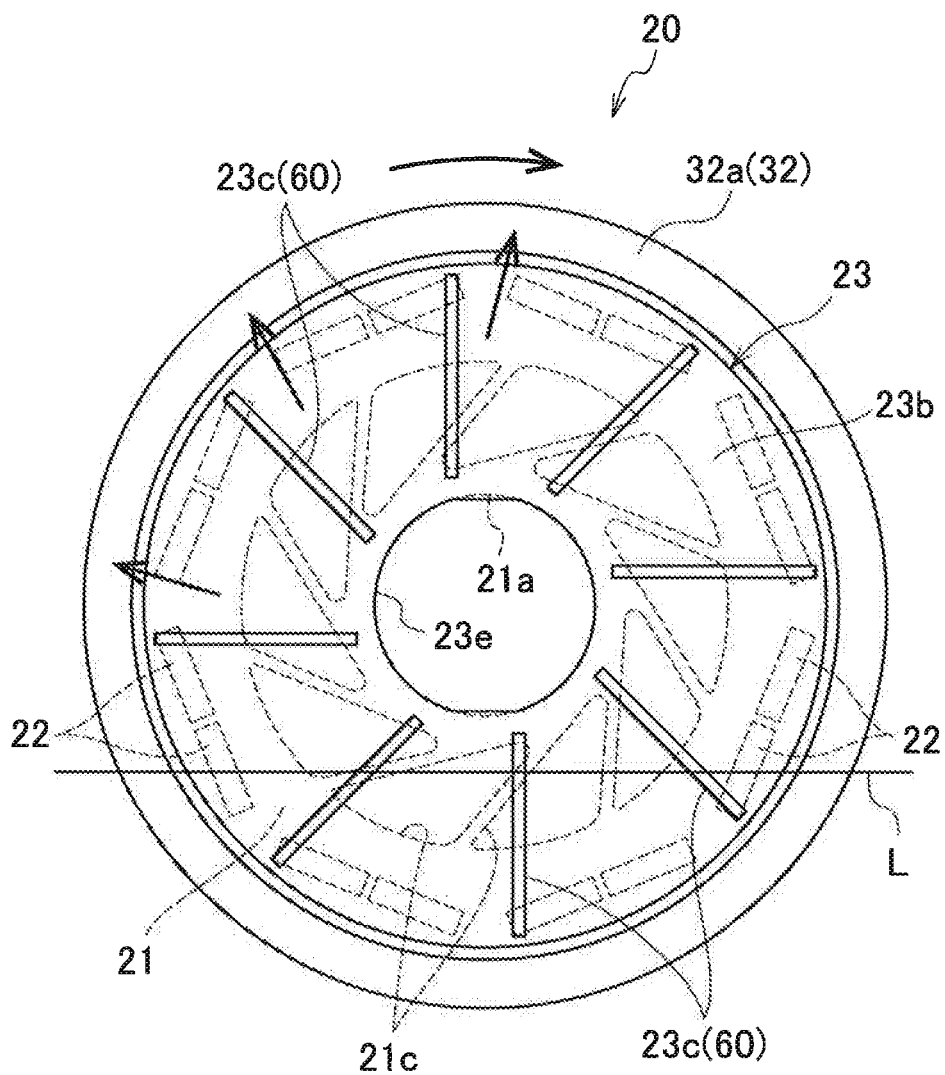
FIG. 5A is a side view illustrating main portions when the rotary electric machine rotates at a low speed.
Figure 5B:
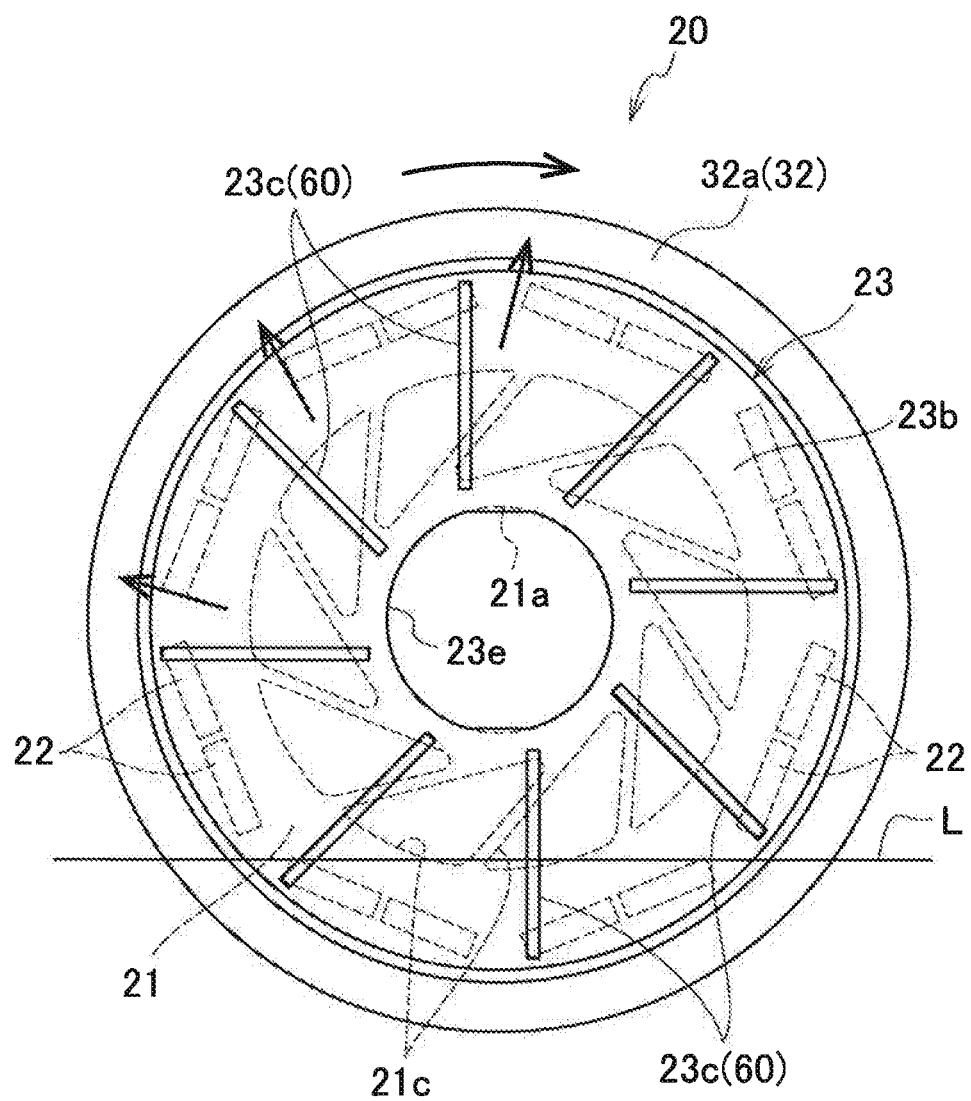
FIG. 5B is a side view of main portions when the rotary electric machine rotates at a high speed.

A cooling operation of the rotary electric machine 10 having the above-described configuration will he described below with reference to FIGS. 5A and 5B. FIG. 5A is a schematic diagram illustrating a state when the rotor 20 rotates at a low speed, and FIG. 5B is a schematic diagram illustrating a state when the rotor 20 rotates at a high speed. In FIGS. 5A and 5B, reference numeral L denotes a liquid level of the storage portion 51.

Since the lower part of the rotor 20 is immersed in the storage portion 51 provided in the case 50 when the rotor 20 rotates at the low speed, the permanent magnet 22 is cooled via the outer peripheral surface of the rotor core 21 and the end face plate 23 during the rotation of the rotor 20. In addition, since the lower part of the stator 30 positioned on the lower outer peripheral side of the rotor 20 is always immersed in the storage portion 51, the coil 32 immersed in the liquid is also constantly cooled.

On the other hand, the coil 32 positioned above the liquid level of the storage portion 51 is exposed from the storage portion 51 and thus tends to become hot, but the end face plate 23 also rotates due to the rotation of the rotor 20. Thus, the liquid lifted by the liquid guide portion 60 is scattered by a centrifugal force due to the rotation of the rotor 20, and the stator 30 positioned on the outer peripheral side of the rotor 20 is also cooled by the scattered liquid. Therefore, the coil 32 positioned above the liquid level of the storage portion 51 is also cooled by the scattered liquid.

Similarly, the lower part of the rotor 20 and the lower part of the stator 30 are also immersed in the storage portion 51 provided in the case 50 when the rotor 20 rotates at the high speed, the permanent magnet 22 is cooled via the outer peripheral surface of the rotor core 21 and the end face plate 23 during the rotation of the rotor 20 and the coil 32 immersed in the liquid is also constantly cooled. Further, since the end face plate 23 also rotates with the rotation of the rotor 20, the liquid lifted by the liquid guide portion 60 is scattered by the centrifugal force due to the rotation of the rotor 20, and thus the coil 32 positioned above the liquid level of the storage portion 51 is also cooled by the scattered liquid.

Since the liquid guide portion 60 is disposed to overlap with the coil end portion 32a in the axial direction, the scattered liquid is mainly supplied to the coil end portion 32a of the coil 32. Accordingly, the coil 32 is cooled from both axial sides, and thus can be efficiently cooled.

Since the amount of liquid to be scattered increases during the low-speed rotation of the rotor 20 compared with the high-speed rotation thereof, the amount of liquid to be supplied to the coil 32 positioned above the liquid level L of the storage portion 51 increases, and the coil 32 can be actively cooled. On the other hand, since the liquid level of the storage portion 51 decreases with the increase in the amount of liquid to be scattered during the high-speed rotation, the permanent magnet 22 can be actively cooled through the rotor core 21 during the low-speed rotation. That is, according to this embodiment, the amount of liquid to be scattered is adjusted depending on the number of rotations of the rotor 20. The amount of liquid to be scattered can also be adjusted depending on the number and shape of liquid guide portions 60.

As described above, according to this embodiment, since the lower part of the rotor 20 is immersed in the storage portion 51, the permanent magnet 22 disposed in the rotor core 21 is cooled by the liquid stored in the storage portion 51. In addition, the liquid stored in the storage portion 51 is guided to the liquid guide portion 60 of the end face plate 23 and is scattered by the centrifugal force with the rotation of the rotor 20, whereby the coil 32 positioned on the outer peripheral side of the rotor 20 is cooled. Thus, both the permanent magnet 22 and the coil 32 can be cooled without using a driving force of an oil pump or the like.

Furthermore, when the rotor 20 rotates at the low speed, the liquid level of the storage portion 51 is high, and thus the permanent magnet 22 can be actively cooled. When the rotor 20 rotates at the high speed, the liquid level of the storage portion 51 lowers and the liquid to be scattered increases, and thus the coil 32 can be actively cooled.

In addition, since the liquid guide portion 60 is the protruding portion 23c protruding from the outside surface 23b in the axial direction, the liquid can be smoothly guided along the protruding portion 23c.

Further, since the liquid guide portion 60 and the coil end portion 32a overlap with each other in the axial direction, the liquid scattered from the end face plate 23 can be supplied to the coil end portion 32a.

Since the plurality of liquid guide portions 60 are provided at equal intervals in the circumferential direction, the liquid can be continuously supplied to the coil during the rotation of the rotor 20.

Subsequently, modified examples of the rotary electric machine 10 according to this embodiment will be described.

FIRST MODIFIED EXAMPLE

Figure 6A:
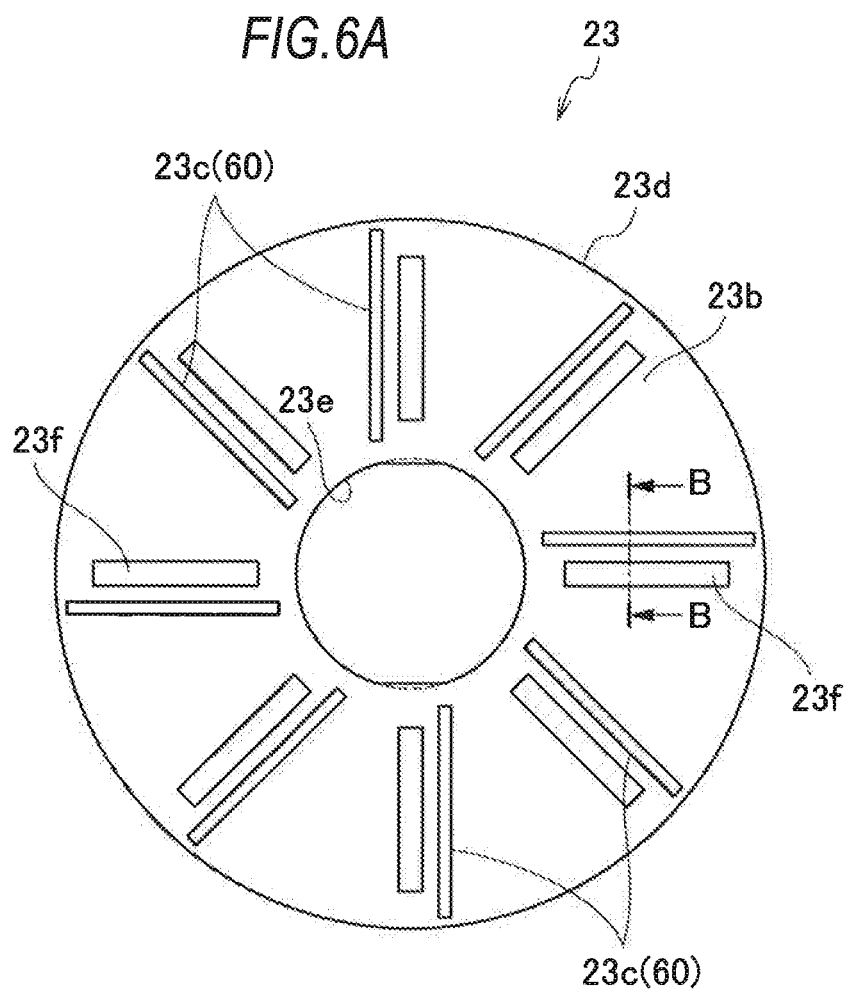
FIG. 6A is a side view of an end face plate according to a first modified example.
Figure 6B:
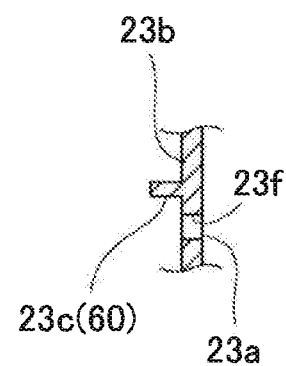
FIG. 6B is a cross-sectional view taken along line B-B in FIG. 6A.

As illustrated in FIGS. 6A, 6B, and 7, in a rotary electric machine 10 according to a first modified example, a through-hole 23f is further provided in the end face plate 23 according to the above embodiment to penetrate through the inside surface 23a and the outside surface 23b.

The through-holes 23f have radially long rectangular shapes when viewed from the side, and are provided so as to extend in the radial direction at equal intervals in the circumferential direction. The through-hole 23f is formed in the end face plate 23, and thus the liquid in the storage portion 51 directly contact with an end face of a rotor core 12 through the through-hole 23f of the end face plate 23, so that the cooling efficiency of a permanent magnet 22 can be enhanced.

In addition, the through-hole 23f is disposed so as to intersect with a lightening hole 21c of the rotor core 21, thereby communicating with the lightening hole 21c of the rotor core 21. Therefore, in a state where a lower part of a rotor 20 is immersed in a storage portion 51 provided in a case 50, the liquid in the storage portion 51 flows into the inside (lightening hole 21c) of the rotor core 21 through the through-hole 23f of the end face plate 23, and thus the permanent magnet 22 can also be cooled from the inside of the rotor core 21.

In the examples illustrated in FIGS. 6A, 6B, and 7, the through-hole 23f is juxtaposed with the liquid guide portion 60 with a predetermined gap in parallel with the liquid guide portion 60 formed on the outside surface 23b of the end face plate 23, but the through-holes 23f can be arbitrary set in regard to the number, shape, and disposing area.

For example, as an outer-diameter-side end portion of the through-hole 23f extends to the outside in the radial direction from the permanent magnet 22, the permanent magnet 22 or the rotor core 21 in the vicinity of the permanent magnet 22 directly contacts with the liquid through the through-hole 23f. Thus, the permanent magnet 22 can be directly cooled by the liquid passing through the through-hole 23f or the permanent magnet 22 can be cooled through the rotor core 21, and the cooling efficiency of the permanent magnet 22 is enhanced. Preferably, the through-hole 23f is disposed so as to extend in the radial direction between the permanent magnets 22 adjacent to each other in the circumferential direction. Thus, there is no hindrance to the original function of the end face plate 23 which prevents the permanent magnet 22 from coming out.

SECOND MODIFIED EXAMPLE

Figure 8A:
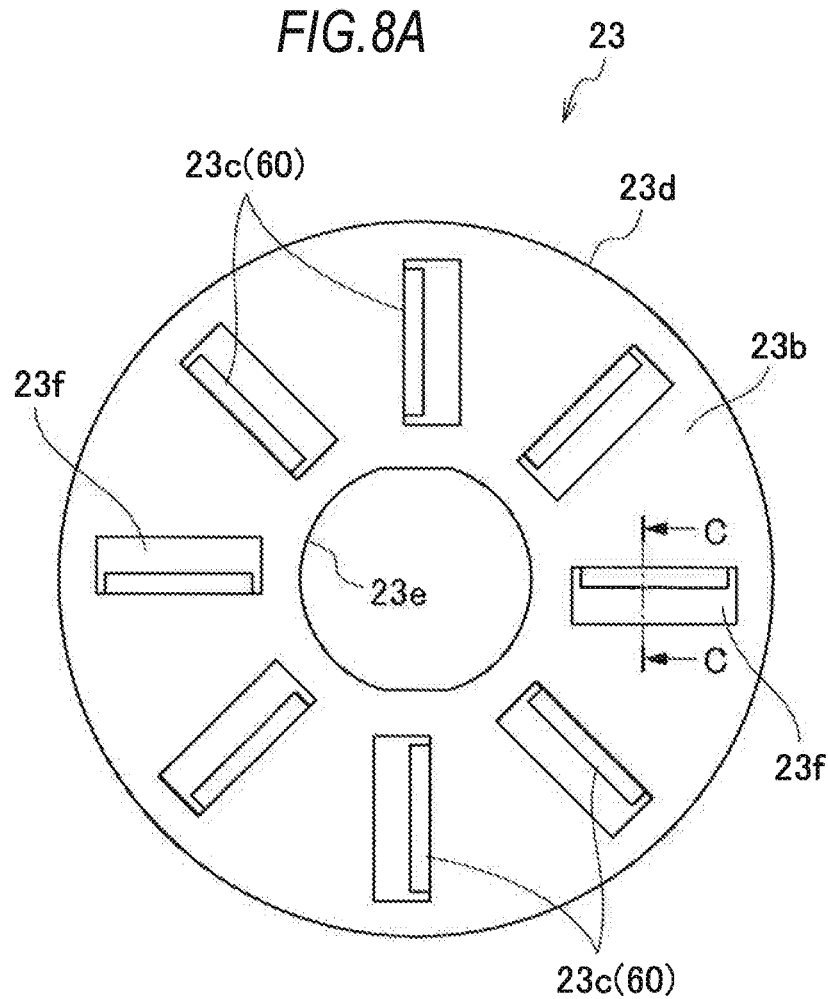
FIG. 8A is a side view of an end face plate according to a second modified example.
Figure 8B:
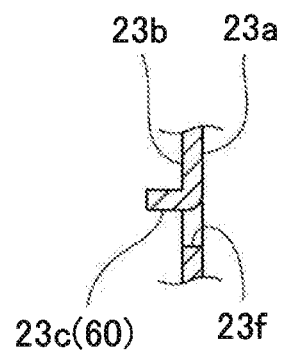
FIG. 8B is a cross-sectional view taken along line C-C in FIG. 8A.

As illustrated in FIGS. 8A, 8B, and 9, a rotary electric machine 10 according to a second modified example is different from the rotary electric machine 10 according to the first modified example in that the through-hole 23f formed in the end face plate 23 is adjacent along the liquid guide portion 60, but has the same configuration except for this and the same operational effect as the first modified example.

Since the through-hole 23f is disposed to be adjacent to the liquid guide portion 60 along the liquid guide portion 60, the through-hole 23f and the liquid guide portion 60 can be simultaneously worked from one thin plate in such a manner that the one thin plate is raised outward while being punched out by press working. That is, in a process of manufacturing the end face plate 23, the through-hole 23f is formed the end face plate 23 by punching in a state where a part thereof is connected, the connecting portion is bent to form a protruding portion on the outside surface 23b, and thus the through-hole 23f and the liquid guide portion 60 can be simultaneously worked from one thin plate.

The invention is not limited to the above-described embodiment and may be appropriately changed or improved.

For example, the rotary electric machine according to the invention may be not only an electric motor but also a generator or a motor generator functioning as an electric motor and a generator.

In addition, the liquid guide portion 60 can he appropriately set in regard to the number, shape, and disposing area. For example, in a case of needing to increase the amount of liquid to be scattered to the coil 32, an L-shaped liquid reservoir may be provided at the inner-diameter-side end portion of the liquid guide portion 60 or the through-hole 23f may be provided on the side opposite to the liquid guide portion 60 in the main rotation direction of the rotary electric machine 10.

DESCRIPTION OF REFERENCE NUMERALS AND CHARACTERS 10 rotary electric machine
20 rotor
21 rotor core
21b magnet accommodating hole
21c lightening hole (lightening portion)
22 permanent magnet
23 end face plate
23a inside surface
23b outside surface
23c protruding portion
23f through-hole
30 stator
31 stator core
32 coil
32a coil end portion
40 rotor shaft 50 case
51 storage portion
60 liquid guide portion.

The invention claimed is:

1. A rotary electric machine, comprising:
a rotor which includes a rotor core, a plurality of permanent magnets disposed in the rotor core, and at least one end face plate disposed such that an inside surface thereof is in contact with an end face of the rotor core;
a stator which includes a stator core and a coil disposed in the stator core, and is disposed on an outer peripheral side of the rotor to face the rotor; and
a case which accommodates the rotor and the stator, and includes a storage portion for storing liquid therein, wherein
a part of the rotor is immersed in the storage portion,
the end face plate includes a liquid guide portion provided on an outside surface of the end face plate to extend in a radial direction, a shaft hole through which a rotor shaft rotating integrally with the rotor core penetrates, and a through-hole which is provided outside of the shaft hole,
the through-hole is disposed to extend in the radial direction between the permanent magnets adjacent to each other in a circumferential direction, and
an outer-diameter-side end portion of the through-hole is positioned radially outside of the permanent magnet.

2. The rotary electric machine according to claim 1, wherein the liquid guide portion is a protruding portion which protrudes in an axial direction from the outside surface.

3. The rotary electric machine according to claim 1, wherein the coil includes a coil end portion which protrudes from one axial end face of the stator core, and the liquid guide portion and the coil end portion overlap with each other in an axial direction.

4. The rotary electric machine according to claim 1, wherein a plurality of the liquid guide portions are provided at equal intervals in a circumferential direction.

5. The rotary electric machine according to claim 1, wherein the rotor core includes a permanent magnet accommodating portion which accommodates the permanent magnet, and a lightening portion which is provided radially inside of the permanent magnet accommodating portion, and
the through-hole communicates with the lightening portion.

6. The rotary electric machine according to claim 1, wherein the through-hole is disposed to be adjacent to the liquid guide portion along the liquid guide portion.

7. A method of manufacturing the rotary electric machine according to claim 6, the method comprises the steps of:
punching and forming the through-hole in the end face plate, and bending and forming a protruding portion on the outside surface.

* * * * *